United States Patent Office

3,652,686
Patented Mar. 28, 1972

3,652,686
PROCESS FOR THE SYNTHESIS OF 2-FLUORO-2,2-DINITROETHANOL
George W. Nauflett and Robert E. Farncomb, Oxon Hill, Md., assignors to the United States of America as represented by the Secretary of the Navy
No Drawing. Filed Oct. 1, 1969, Ser. No. 866,070
Int. Cl. C07c 31/34
U.S. Cl. 260—633                                    5 Claims

ABSTRACT OF THE DISCLOSURE

Process for the preparation of 2-fluoro-2,2-dinitroethanol which involves the reaction of nitromethane and formaldehyde in the presence of a base, nitrating the product thereof by the action of tetranitromethane to form 2,2-dinitrol-1,3-propanediol, contacting the 2,2-dinitrol-1,3-propanediol with an alkali metal base and fluorinating the product thereof.

BACKGROUND OF THE INVENTION

This invention relates to a process for the preparation of 2 - fluoro - 2,2 - dinitroethanol (FDNOL), which is especially useful as an intermediate in the preparation of the nitroplasticizer, bis(2-fluoro-2,2-dinitroethyl)formal.

In the past, FDNOL has been prepared by the reaction of formaldehyde and nitromethane in the presence of base, such as NaOH, to form the sodium salt of 2-nitro-1,3-propanediol (S-Diol). The S-Diol is subsequently subjected to a Shecter-Kaplan oxidative-nitration with silver nitrate and sodium nitrite to form 2,2-dinitro-1,3-propanediol (A-Diol). Because of the enormous volume of materials present at this point and because of the presence of contaminate materials such as silver, the A-Diol must be extracted with ether from the reaction mixture before it can be fluorinated. Thus, after extraction the A-Diol is deformylated and fluorinated to yield the FDNOL. Although, this process has met with some success, it is a somewhat expensive and tedious procedure, mainly due to the utilization of silver containing reagents and the necessity for tedious and hazardous ether extractions of the A-Diol from the reaction mixture before fluorination to yield the final product.

SUMMARY OF THE INVENTION

It is therefore an object of the present invention to provide a new process for the synthesis of 2-fluoro-2,2-dinitroethanol.

Another object of this invention is to provide a process for the preparation of 2-fluoro-2,2-dinitroethanol which is more simple and economical than processes used in the past.

These and other objects are accomplished by a process which basically involves the formation of a salt of 2-nitro-1,3-propanediol by the reaction of nitromethane and formaldehyde in the presence of a base, the nitration of this salt by the action of tetranitromethane to form A-Diol, deformylating the A-Diol and concomitantly forming an alkali metal salt by the action of an alkali metal base and fluorinating said alkali metal salt with gaseous fluorine to yield the FDNOL.

DESCRIPTION OF THE PREFERRED EMBODIMENTS

The present process for the preparation of FDNOL involves the reaction of nitromethane and formaldehyde in the presence of base, preferably sodium hydroxide, at room temperature or preferably at a temperature a little below room temperature, e.g. 0° C.–25° C., to form the sodium salt of 2-nitro-1,3-propanediol, commonly known as S-Diol. Of course, other alkali metal bases, such as KOH, may also be utilized in which case the respective alkali metal salt of 2-nitro-1,3-propanediol is formed. This initial reaction is performed in a compatible solvent, such as methanol or water, preferably water, however, with mixing of the reactants and is completed in about ½ to 2 hours dependent upon the rate of mixing. At this point the S-Diol or other alkali metal salt of 2-nitro-1,3-propanediol may be either removed from the reaction mixture or kept intact. In either case, the S-Diol or other alkali metal salt of 2-nitro-1,3-propanediol is then reacted with tetranitromethane in the same solvent initially employed, at a temperature below room temperature, preferably from about 0° to 15° C., with stirring for approximately one to three hours to yield 2,2-dinitro-1,3-propanediol (A-Diol). Although not essential, a small amount of a surfactant has been found to be helpful during this stage of the reaction, i.e., the reaction of the tetranitromethane and S-Diol or the appropriate alkali metal salt of 2-nitro-1,3-propanediol, in order to afford greater surface contact area between the reagents. The surfactant is therefore especially helpful if it should be desirable to employ a non-common solvent at this point in the reaction. Any surfactant which delivers surface active properties in basic media may be employed for the purposes of this invention. Among such surfactants are FC–95 and FC–172 both amphoteric biodegradable fluorocarbons manufactured by the 3M Company, St. Paul, Minn., alkylbenzene- sulfonic acids, such as p-toluenesulfonic acid, p-dodecylbenzenesulfonic acid, and the long chain alkyl sulfates, such as lauryl sulfate (Dreft).

The A-Diol prepared by the reaction of the tetranitromethane and the alkali metal salt of 2-nitro-1,3-propanediol is then contacted with an alkali metal base such as NaOH, KOH, etc. The action of the base on the A-Diol is two-fold in that it deformylates the A-Diol and concomitantly forms an intermediate alkali metal salt of the deformylated product. The amount of alkali metal base employed is not critical, however, a sufficient amount to completely achieve the hereinabove stated purposes should be employed. Moreover, the pH of the reaction mixture at this stage should be in the range of from about 7–10, preferably about 10. Fluorination of this intermediate alkali metal salt forms the desired FDNOL product. The fluorination process is performed utilizing gaseous elemental fluorine in a nitrogen atmosphere and usually requires cooling to maintain the reaction temperature at room temperature or a temperature a little below room temperature, i.e., from about 0°–25° C. The fluorination time varies and is dependent upon the rate of flow of fluorine which is employed. However, the fluorination is completed when a noticeable change in the color of the reaction mixture is observed. The FDNOL is easily separated from the reaction mixture by first removing the fluoronitroform layer and then extracting the remaining solution with a suitable solvent, such as methylene chloride, and evaporation of the solvent to obtain the FDNOL.

The process of the present invention may be shown as follows:

(I) $$CH_3NO_2 + 2CH_2O \xrightarrow{NaOH} HOCH_2C(NO_2Na)CH_2OH$$
(S—Diol)

$$\downarrow C(NO_2)_4$$

$$FDNOL + FC(NO_2)_3 \xleftarrow[(2) F_2]{(1) \text{ base}} HOCH_2C(NO_2)_2CH_2OH + NaC(NO_2)_3$$
(A—Diol)

The general nature of the invention having been set forth, the following examples are presented as specific

EXAMPLE I

A solution of 19.8 grams (0.324 mole) of nitromethane, 40 ml. (0.65 mole) of formaldehyde (stabilized with 12 percent methanol), 300 ml. of water and 0.2 grams FC–95 surfactant was stirred and cooled to 0° C. A drop of sodium hydroxide solution (14.8 grams, 0.370 mole in 60 ml. water) was added to the solution and heated to 30° C. The solution was again cooled to 0° C. and the remainder of the sodium hydroxide solution was then completely added in a steady stream. After about 15–30 minutes, 63.6 grams (0.325 mole) of tetranitromethane was added to the reaction mixture and stirred for three hours at 0° C. Sodium hydroxide (15.0 grams, 0.325 mole in 60 ml. of water) was then added. At this point the reaction mixture was filtered and the filtrate was distilled at 25° C./5 mm. Hg to remove any methanol and excess formaldehyde. The remaining orange solution (40.2 grams) was fluorinated with elemental gaseous fluorine in a nitrogen atmosphere (40 percent by volume of $F_2$ in nitrogen) with cooling in the range of 0° C. to 5° C. until a slightly yellow suspension, pH 3, was observed (about 110 minutes). The water-insoluble fluorotrinitromethane (26.3 grams, 48.5 percent yield) was separated and the aqueous phase was extracted with five 150 ml. portions of methylene chloride. After distillation of the methylene chloride, a yellow oil remained (34.2 grams) which upon analysis by vapor phase chromatography showed a 94 percent content of 2-fluoro-2,2-dinitroethanol (65 percent yield). The 2-fluoro-2,2-dinitroethanol was then separated from the oil by distillation of 50° C.–60° C. at 500–700 microns Hg and further identified by gas chromatographic analysis methods.

EXAMPLE II

A solution of sodium 2-nitropropane-1,3-diol (0.375 mole) in water (600 ml.) was prepared. Surfactant FC–172 (1 gram) and tetranitromethane (88 grams) were added and the mixture was stirred and cooled to 15° C. after stirring for one hour, sodium hydroxide (40 grams) was added, the cooling bath removed and 21 grams of sodium carbonate was added. The temperature rose to 40° C. After standing overnight at 15° C. the orange solution was fluorinated with gaseous fluorine (40 percent by volume of $F_2$ in nitrogen) until a milky-white suspension was obtained. The water-insoluble fluorotrinitromethane was separated (33.2 grams, 39 percent yield) and the aqueous phase was extracted with five portions (100 milliliters) methylene chloride. After distillation of the solvent, a yellow oil remained (31.3 grams) which contained 80 percent 2-fluoro-2,2-dinitroethanol (46 percent yield).

Similar results were obtained employing p-toluenesulfonic acid in place of the surfactant used in Examples I and II.

Obviously, many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. A process for preparing 2-fluoro-2,2-dinitroethanol which comprises the steps of:
   (1) reacting nitromethane and formaldehyde in the presence of an alkali metal base,
   (2) reacting the product thereof with tetranitromethane,
   (3) contacting the product of step (2) with an alkali metal base and
   (4) fluorinating the product thereof.

2. The process of claim 1 wherein the reaction of step (2) is performed in the presence of a surfactant.

3. The process of claim 1 wherein said alkali metal base in step (1) and step (3) is selected from the group consisting of sodium hydroxide and potassium hydroxide.

4. The process of claim 1 wherein said alkali metal base of step (3) is added in an amount sufficient to attain a pH of about 10.

5. The process of claim 2 wherein said surfactant is selected from the group consisting of amphoteric biodegradable fluorocarbons, alkylbenzenesulfonic acids, and long chain alkyl sulfates.

References Cited

UNITED STATES PATENTS

| | | | |
|---|---|---|---|
| 3,388,147 | 6/1968 | Kamlet et al. | 149—88 X |
| 3,387,044 | 6/1968 | Grakauskas et al. | 260—644 |
| 3,388,147 | 6/1968 | Kamlet et al. | 149—88 X |
| 3,446,857 | 5/1969 | Adolph | 260—633 |

LELAND A. SEBASTIAN, Primary Examiner

U.S. Cl. X.R.

260—635 N, 644